United States Patent
Mianzo et al.

(10) Patent No.: US 10,163,033 B2
(45) Date of Patent: Dec. 25, 2018

(54) VEHICLE CLASSIFICATION AND VEHICLE POSE ESTIMATION

(71) Applicant: Caterpillar Inc., Peoria, IL (US)

(72) Inventors: Lawrence Andrew Mianzo, Pittsburgh, PA (US); Bradley Scott Kriel, Pittsburgh, PA (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/376,920

(22) Filed: Dec. 13, 2016

(65) Prior Publication Data

US 2018/0165502 A1    Jun. 14, 2018

(51) Int. Cl.
    *G06K 9/62*        (2006.01)
    *G06K 9/00*        (2006.01)
    *G06T 7/73*         (2017.01)

(52) U.S. Cl.
    CPC ....... *G06K 9/6202* (2013.01); *G06K 9/00624* (2013.01); *G06T 7/73* (2017.01); *G06T 2207/10004* (2013.01); *G06T 2207/30248* (2013.01)

(58) Field of Classification Search
None
See application file for complete search history.

(56) References Cited

U.S. PATENT DOCUMENTS

| | | | |
|---|---|---|---|
| 8,457,392 | B2 | 6/2013 | Cavallaro et al. |
| 8,503,760 | B2 | 8/2013 | Lee et al. |
| 2011/0148856 | A1 | 6/2011 | Sprock et al. |
| 2013/0028517 | A1* | 1/2013 | Yoo ............... G06K 9/00375 382/173 |
| 2014/0247347 | A1* | 9/2014 | McNeill ............. H04N 7/18 348/143 |
| 2016/0078363 | A1* | 3/2016 | Hodel ............... G06N 99/005 706/12 |
| 2016/0086028 | A1* | 3/2016 | Francois ........... G06K 9/00536 348/46 |
| 2016/0210757 | A1 | 7/2016 | Lavoie |
| 2016/0292846 | A1* | 10/2016 | Sprock ............. G05B 19/00 |
| 2016/0292933 | A1* | 10/2016 | Sprock ............. G07C 5/008 |

FOREIGN PATENT DOCUMENTS

| | | |
|---|---|---|
| AU | 2014271204 A1 | 12/2015 |
| CN | 201134038 Y | 10/2008 |
| CN | 102798350 B | 5/2015 |
| WO | 2008064892 A1 | 6/2008 |

* cited by examiner

*Primary Examiner* — Delomia L Gilliard
(74) *Attorney, Agent, or Firm* — Miller, Matthias & Hull (57) ABSTRACT

A method of classifying a work machine within a worksite is provided. The method may include receiving one or more captured images of the work machine from one or more image capture devices, identifying at least two classifiers within the captured images of the work machine, determining spatial relationships between the classifiers within the captured images, determining a classification and a pose of the work machine based on the spatial relationships, and displaying analytics based on the classification and the pose of the work machine.

17 Claims, 5 Drawing Sheets

VEHICLE CLASSIFICATION AND VEHICLE POSE ESTIMATION

TECHNICAL FIELD

The present disclosure relates generally to monitoring systems, and more particularly, to visual recognition techniques for monitoring vehicles or work machines within a worksite.

BACKGROUND

Various vehicles or work machines, such as trucks, dozers, motor graders, wheel loaders, wheel tractor scrapers, and the like, are often used to simultaneously perform a variety of different tasks within a given worksite. For larger projects extending over longer periods of time, it can be useful to track the progress of the work being performed, which involves not only monitoring the efficiency with which each of the work machines is being operated, but also tracking overall work productivity. One manner of tracking work progress relies on combinations of sensors and tracking devices that are installed on the work machines and within the worksite. Specifically, the sensors track operations performed by each individual work machine, while the tracking devices track the locations of the work machines relative to the worksite as well as changes in the terrain within the worksite. Although such conventional tracking methods may serve its purpose, there is still room for improvement.

In light of modern technological advancements, the conventional method of monitoring feedback from sensors and tracking devices can appear overly complex and tedious. For instance, sensors and tracking devices can take up a considerable amount of physical space on a work machine or within a worksite. The installation, configuration, and maintenance of such sensors and tracking devices can also be significant in terms of both cost and time, especially in larger projects or worksites which may require several sets of work machines to operate simultaneously at any given moment. Furthermore, the feedback provided by sensors and tracking devices are also not exempt from errors and miscommunications, which can be costly and time-consuming to detect and correct. Thus, there is a general need for a more simplified tracking technique that is less intrusive to the work machines and the worksite.

The use of visual recognition systems is becoming increasingly more widespread. In general, visual recognition systems are used to identify different objects within a digital image or video. One such visual recognition system is disclosed in U.S. Pat. No. 8,503,760 ("Lee"). Lee identifies a location and pose of an object within an image using visual recognition techniques. Lee then estimates changes in the object position or pose using a combination of probabilistic modeling and filtering techniques. Although Lee may be adequate for objects with limited movement or for applications which allow for estimation errors, the techniques in Lee may be inadequate for distinguishing between and tracking various work machines within a dynamically changing environment, where each machine has several moving components and possibly even articulation, and where work productivity analyses rely on more accurate feedback.

In view of the foregoing disadvantages associated with conventional monitoring or tracking techniques, a need exists for a solution which is not only capable of effectively tracking multiple vehicles or work machines within a changing environment, but also capable of doing so less intrusively. In particular, there is a need for a monitoring system that relies less on sensors and tracking devices and more on visual recognition techniques not only to classify different work machines from captured images, but also to track the operations of the individual work machines. The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, a method of classifying a work machine within a worksite is provided. The method may include receiving one or more captured images of the work machine from one or more image capture devices, identifying at least two classifiers within the captured images of the work machine, determining spatial relationships between the classifiers within the captured images, determining a classification and a pose of the work machine based on the spatial relationships, and displaying analytics based on the classification and the pose of the work machine.

In another aspect of the present disclosure, a system for classifying a work machine within a worksite is provided. The system may include one or more image capture devices configured to generate one or more captured images of the work machine, and a visual recognition device in communication with the one or more image capture devices. The visual recognition device may be configured to receive the captured images from the image capture devices, identify at least two classifiers within the captured images, determine spatial relationships between the classifiers within the captured images, and determine a classification and a pose of the work machine based on the spatial relationships.

In yet another aspect of the present disclosure, a device for classifying a work machine within a worksite is provided. The device may include a communication device in communication with one or more image capture devices, a memory configured to retrievably store one or more algorithms, and a controller in communication with each of the communication device and the memory. The controller may be configured to receive one or more captured images of the work machine from the image capture devices, identify at least two classifiers within the captured images, determine spatial relationships between the classifiers within the captured images, and determine a classification and a pose of the work machine based on the spatial relationships.

These and other aspects and features will be more readily understood when reading the following detailed description in conjunction with the accompanying drawings.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
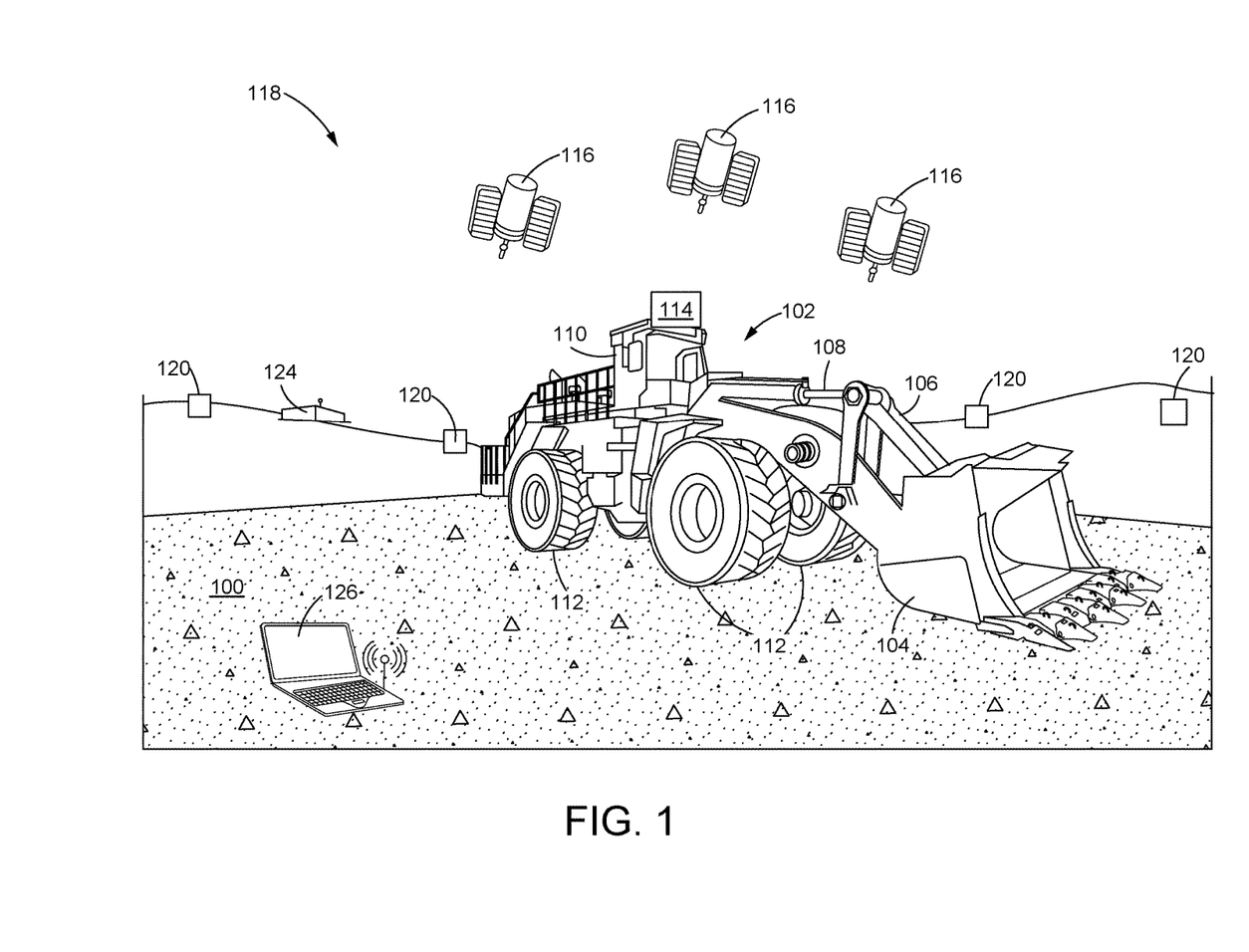
FIG. 1 is a pictorial illustration of one exemplary embodiment of a visual recognition system of the present disclosure.

Referring now to FIG. 1, one exemplary worksite 100 is illustrated with one or more vehicles, or more particularly, work machines 102. The worksite 100 may include, for example, a mine site, a landfill, a quarry, a construction site, or the like. The work machines 102 may be configured to perform tasks generally associated with altering the geography at the worksite 100, such as dozing operations, grading operations, leveling operations, a bulk material removal operations, or any other type of operation that modifies the terrain or geography of the worksite 100 over time. The work machines 102 may be mobile machines configured to perform operations associated with industries related to mining, construction, farming, or any other industry known in the art. The work machines 102 depicted in FIG. 1, for example, may embody off-highway trucks, articulated trucks, wheel loaders, excavators, dozers, motor graders, wheel loaders, wheel tractor scrapers, or other types of work machines 102 that may be manually, semi-autonomously or autonomously operated.

As shown in FIG. 1, the work machine 102 may include various moving parts or components. In the wheel loader configuration of FIG. 1, for instance, the work machine 102 may include an implement 104, such as a bucket, that is movable via linkages 106 and actuators 108. The implement 104 may be remotely operated or manually operated from within an operator cab 110. The work machine 102 may also include traction devices 112, such as wheels or tracks, for moving the work machine 102 along terrain within the worksite 100. In addition, the work machines 102 may also include tracking devices 114 capable of signaling or tracking a geographical position or location of the work machine 102 relative to the worksite 100. For instance, the tracking device 114 may track location information using one or more satellites 116, such as via a Global Positioning System (GPS), a Global Navigation Satellite System (GNSS), or the like. The tracking devices 104 may also be used to monitor geographic features within the worksite 100 as well as changes therein over time.

Still referring to FIG. 1, a visual recognition system 118 may also be provided within the worksite 100 and configured to visually track the various work machines 102 therein. As shown, the visual recognition system 118 may generally include one or more image capture devices 120, and one or more visual recognition devices 122 in communication with the image capture devices 120. Specifically, the image capture devices 120 may include video cameras, or the like, configured to generate images or videos of one or more of the work machines 102 in digital format. Moreover, a plurality of image capture devices 120 may be positioned around a perimeter within the worksite 100 so as to enable multiple views of each work machine 102 from multiple angles, and to ensure at least one line of sight with each work machine 102 even when there is an obstruction.

The visual recognition system 118 of FIG. 1 may be implemented in any number of different arrangements. For example, the visual recognition device 122 may be at least partially implemented within a command center 124 situated locally and/or remotely relative to the worksite 100 with sufficient means for communicating with the work machines 102, for example, via the satellites 116, or the like. Additionally or alternatively, the visual recognition device 122 may be implemented using one or more computing devices 126 with means for communicating with one or more of the work machines 102 or one or more command centers 124. In still further alternatives, the visual recognition device 122 may be at least partially implemented on-board any one or more of the work machines 102 that are present within the worksite 100. Other suitable modes of implementing the visual recognition system 118 are possible and will be apparent to those of ordinary skill in the art.

Figure 2:
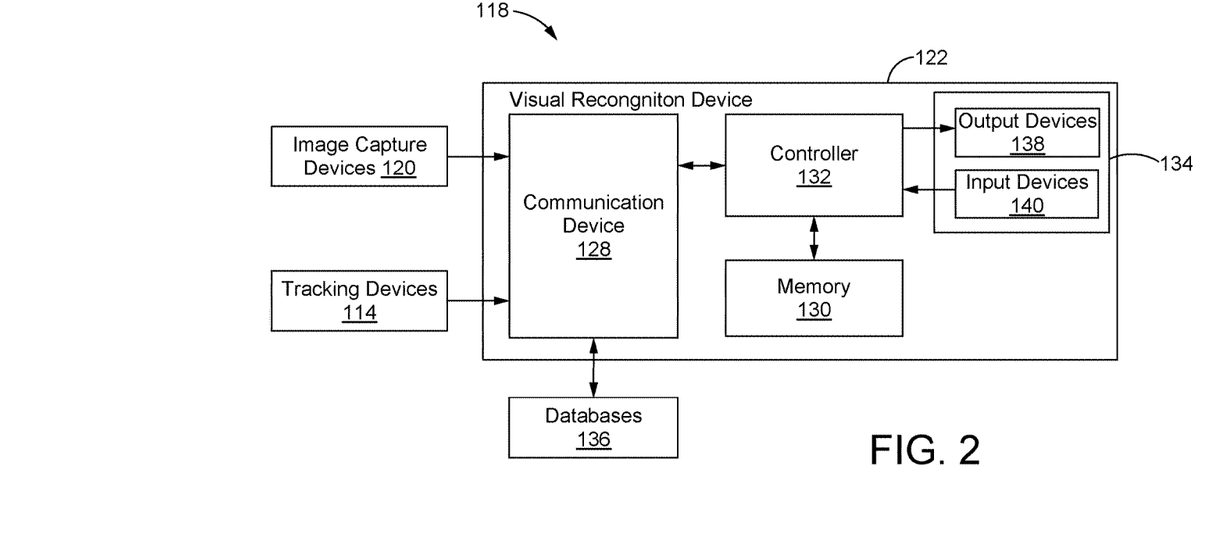
FIG. 2 is a diagrammatic view of one exemplary embodiment of a visual recognition device of the present disclosure.

Turning now to FIG. 2, one exemplary embodiment of the visual recognition system 118 and the visual recognition device 122 thereof is diagrammatically provided. As shown, the visual recognition device 122 may include a communication device 128, a memory 130, a controller 132, and a user interface 134 configured to enable an operator to interact with the visual recognition device 122. Specifically, the communication device 128 may be in wired and/or wireless communication with one or more of the image capture devices 120, and additionally or optionally, in wired and/or wireless communication with one or more tracking devices 112 and databases 136 that may be referenced by the controller 132. Furthermore, the user interface 134 may include output devices 138, such as display screens or other devices configured to graphically display information to an operator, as well as input devices 140, such as touchscreens, touchpads, capacitive keys, buttons, dials, switches, or other devices capable of receiving input from an operator.

Still referring to FIG. 2, the memory 130 may be provided on-board the controller 132, external to the controller 132, or otherwise in communication therewith, and include non-transitory computer-readable medium or memory, such as a disc drive, flash drive, optical memory, read-only memory (ROM), or the like. The controller 132 may be implemented using any one or more of a processor, a microprocessor, a microcontroller, or any other suitable means for executing instructions stored within the memory 130. Moreover, such instructions or code stored within the memory 130 may preprogram or configure the controller 132 to communicate with one or more of the image capture devices 120, the tracking devices 114 and the databases 136, such as via the communication device 128, and visually track various work machines 102 within the worksite 100 based on images or videos thereof.

Figure 3:
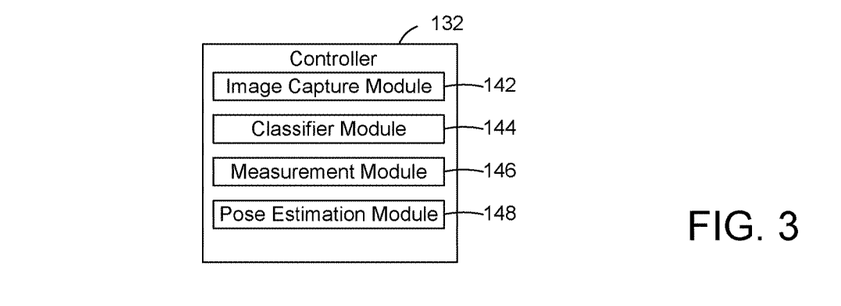
FIG. 3 is a diagrammatic view of one exemplary embodiment of a controller for a visual recognition device.

Turning to FIG. 3, the controller 132 of the visual recognition device 122 may be preprogrammed to operate according to one or more algorithms, or sets of logic instructions or code, which may generally be categorized into, for example, an image capture module 142, a classifier module 144, a measurement module 146, and a pose estimation module 148. Although only one possible arrangement for programming the controller 132 is shown, it will be understood that other arrangements or categorizations of instructions or code can be similarly implemented to provide comparable results. According to the specific embodiment shown in FIG. 3, the image capture module 142 may configure the controller 132 to receive captured images 150 of one or more work machines 102 from the image capture devices 120 as shown for example in FIGS. 4 and 5. Moreover, the captured images 150 may be provided in digital form, and extracted from a plurality of still photos or individual frames of a video taken from one or more of the image capture devices 120.

Upon receiving one or more captured images 150, the classifier module 144 of FIG. 3 may be used to visually identify two or more classifiers 152 within the captured images 150. Generally, classifiers 152 may be indicative of one or more known parts or components of a work machine 102 that are common for all work machines 102 of a given type, and are plainly visible from an exterior view of the work machine 102. In a wheel loader type of work machine 102, for example, a classifier 152 may correspond to any one or more of bucket implements 104, booms or linkages 106, hydraulic cylinders or actuators 108, operator cabs 110, wheeled traction devices 112, and any other visually identifiable reference points. Similarly, in other types of work machines 102, the classifier module 144 may employ other categories of parts or components as classifiers 152. Furthermore, the classifier module 144 may refer to reference models or other reference data in order to visually recognize and identify certain classifiers 152 from within the captured images 150.

In one embodiment, the classifier module 144 of FIG. 3 may identify different classifiers 152 based on comparisons to reference models or data that have been previously stored within the database 136. For instance, the visual recognition system 122 may initially undergo a learning stage, within which one or more libraries of reference models or data may be built. Specifically, the reference models or data may provide digital templates, each corresponding to a different classifier 152 or a graphical representation thereof. Using the digital templates as reference, the classifier module 144 may be able to learn the features to look for in a captured image 150. The classifier module 144 may confirm the presence of a classifier 152 when there is a substantial match between the digital template and the digital patterns within a captured image 150. Other learning techniques or processes may similarly be used to enable visual recognition of classifiers 152.

In addition, once the classifier module 144 has identified at least two different classifiers 152 from within a given captured image 150, the measurement module 146 of FIG. 3 may be configured to determine spatial relationships between the classifiers 152 identified within the captured images 150. Specifically, the measurement module 146 may be configured to determine the spatial relationships between the classifiers 152 by measuring the relative positions or distances between the classifiers 152 identified within the captured images 150. The measurement module 146 may also perform such measurements over a series of captured images 150 in the order the captured images 150 were taken, which may help provide a more refined spatial relationship between the classifiers 152, for instance, if the work machine 102 is moving in those captured images 150. Measurements may also be performed across two or more image capture devices 120 positioned at different angles relative to the work machine 102 to further refine the spatial relationship.

Furthermore, based on the spatial relationship, the pose estimation module 148 of FIG. 3 may be configured to determine a classification and a pose of the work machine 102. For example, if a spatial relationship is established between a bucket implement 104 and wheeled traction devices 112, the pose estimation module 148 may be able to classify the work machine 102 as a wheel loader vehicle. Moreover, once the type of work machine 102 is known, the pose estimation module 148 may use the spatial relationship to more affirmatively determine the pose of the work machine 102. Similar to the learning process discussed above, for instance, a database 136 associated with the pose estimation module 148 may include predefined libraries of different types of work machines 102 that may be used within the given worksite 100, as well as the different possible combinations of classifiers 152 and spatial relationships therebetween. The pose estimation module 148 may be able to make the determinations of classification and pose by referring to such databases 136.

Still referring to FIG. 3, the controller 132 may additionally be configured to continue to track the pose of the work machine 102 and monitor the operating state of the work machine 102 over time. For example, the controller 132 may reiteratively track the classifiers 152 and successive poses of a given work machine 102 in order to determine various helpful analytics related to the worksite 100 or the given work plan. By comparing two or more successive poses of a wheel loader type work machine 102, for instance, the controller 132 may be able to determine if the work machine 102 is loading material into the bucket implement 104, carrying material to a dump site, dumping material out of the bucket implement 104, or the like. The pace with which such operations are performed can be tracked to determine work productivity, operator efficiency, overall work progress, and the like. The controller 132 may also incorporate information pertaining to the state of the terrain within the worksite 100, or changes in terrain measurements over time, such as determined via tracking devices 114, or the like, to provide more refined analytics.

Figure 6:
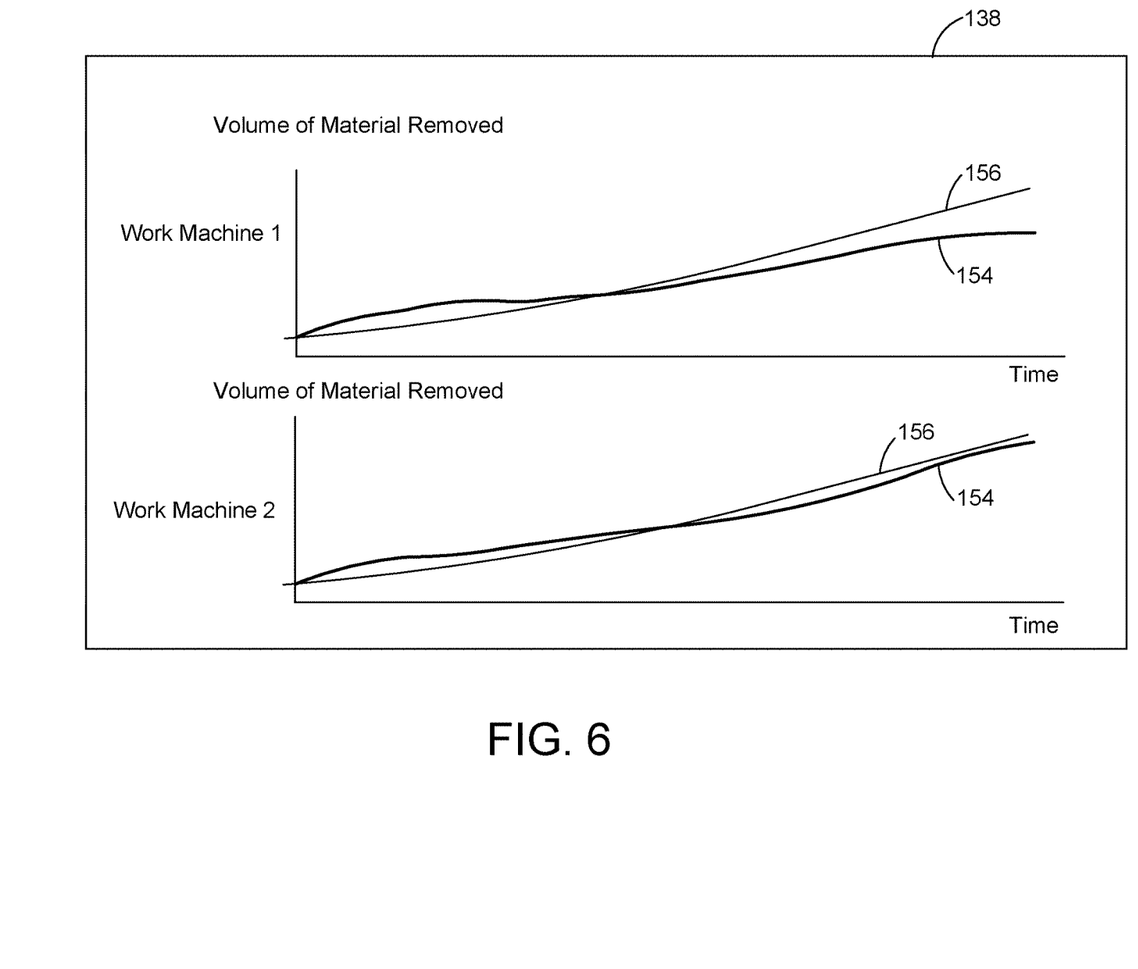
FIG. 6 is a pictorial illustration of one exemplary output device displaying analytics of a work machine and a worksite.

Referring back to FIG. 2, the controller 132 may present various analytics that may be helpful to an operator through the user interface 134, or more particularly, through one or more output devices 138 associated therewith. As shown in FIG. 6, for example, the output device 138 may display graphs or other visual cues relating to work productivity, operational efficiency, or other analytics of one or more on-site work machines 102. As shown, the analytics may compare actual data 154, such as the volume of material actually removed from the worksite 100 within a given timeframe, against model data 156, such as the volume of material that should be ideally removed from the worksite 100 in the given timeframe. Such analytics and data may be useful to the operator in pinpointing areas of improvement, such as in terms of the efficiency of machine operation, or the like. The analytics and data provided via the output devices 138 may further be modified or manipulated by the operator based on input received via the input devices 140 of the visual recognition device 122.

Still referring to FIG. 6, the actual data 154 depicted through the output devices 138 may include data derived from the pose of the work machines 102 as tracked by the visual recognition device 122. The actual data 154 shown may also incorporate any additional measurements of the terrain, such as data acquired through one or more of the tracking devices 114 provided within the worksite 100. The model data 156 may include predetermined data that can be retrieved from the database 136 associated with the visual recognition device 122. Moreover, the model data 156 may be derived in part based on work plans, historical data recorded from other comparable worksites 100 or projects, or the like. Furthermore, the analytics and data presented via the output devices 138 may be accessible by any operator that is locally or remotely situated relative to the worksite 100 with access to an associated command center 124 or computing device 126.

INDUSTRIAL APPLICABILITY

In general, the present disclosure sets forth methods, devices and systems for mining, excavations, construction or other material moving operations where there are motivations to provide simplified and yet effective ways to monitor individual vehicles or work machines. Although applicable to any type of vehicle, the present disclosure may be particularly applicable to work machines, such as off-highway trucks, articulated trucks, wheel loaders, excavators, dozers, motor graders, wheel loaders, wheel tractor scrapers, or other mining or earthmoving machines, typically found within a worksite. Moreover, by enabling visual recognition of various work machines within a worksite, the present disclosure reduces the reliance on sensors and gauges to track work machines and to monitor productivity. Furthermore, by tracking changes in the pose of a work machine over time, the present disclosure is able to provide analytics that can be valuable for maximizing productivity and efficiency.

Figure 7:
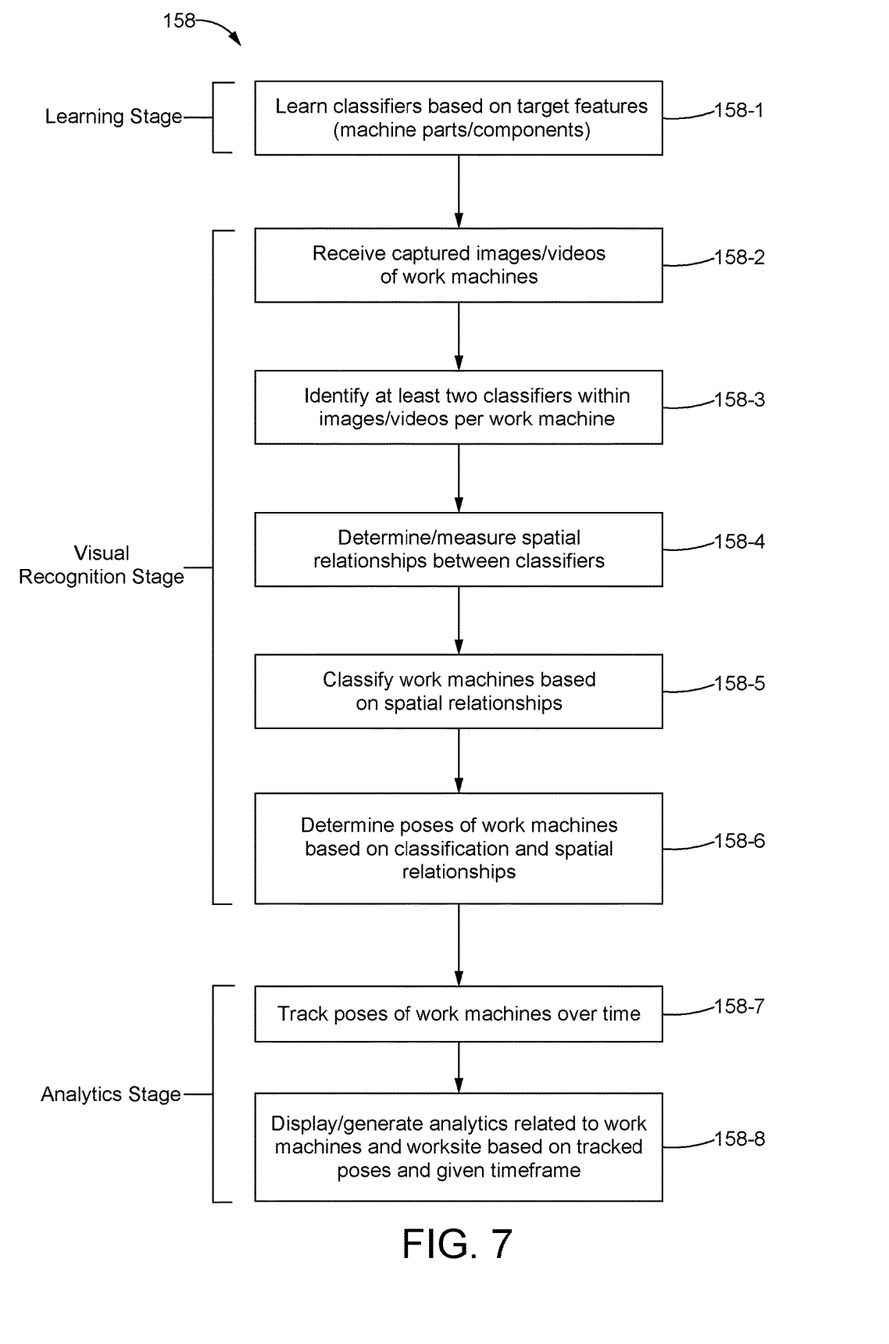
FIG. 7 is a flow diagram of one exemplary method of classifying and estimating a pose of a work machine.

Turning now to FIG. 7, one exemplary method 158 of classifying a work machine 102 within a worksite 100 and estimating a pose thereof is provided. As shown, the method 158 in block 158-1 may initially undergo a learning stage within which the method 158 learns different classifiers 152, or features to look for in a given captured image 150. As discussed above, although different learning schemes may be employed, each may provide reference models or data of detectable features that may be identified as classifiers 152. Once the learning stage is sufficiently complete, the method 158 may proceed to the visual recognition stage and receive captured images 150, such as a series of photographs or videos, of one or more work machines 102 within the worksite 100 in block 158-2. For instance, the method 158 may retrieve captured images 150 from one or more image capture devices 120 disposed within the worksite 100.

Based on the captured images 150, the method 158 in block 158-3 of FIG. 7 may be configured to identify two or more classifiers 152 for each captured work machine 102. In a wheel loader, as shown for example in FIGS. 4 and 5, the method 158 may be able to identify classifiers 152 that are representative of bucket implements 104, booms or linkages 106, hydraulic cylinders or actuators 108, operator cabs 110, wheeled traction devices 112, and the like. Once at least two classifiers 152 have been identified, the method 158 in block 158-4 may determine or measure any spatial relationships between the classifiers 152 from within the captured image 150. Specifically, the method 158 may confirm whether the identified classifiers 152 are indeed what they resemble. For example, the method 158 may verify whether classifiers 152 identified as the operator cab 110 are positioned above classifiers 152 identified as the traction devices 112, and/or whether classifiers 152 identified as the linkages 106 are spatially positioned between classifiers 152 identified as the implement 104 and the traction devices 112.

In addition to verifying the classifiers 152, the method 158 in block 158-4 of FIG. 7 may also determine other geometric relationships between the classifiers 152, and measure the relative distances between the identified classifiers 152. Based on these spatial relationships and the identified classifiers 152, the method in block 158-5 may further be able to classify or identify the type of work machine 102 that is present in the captured image 150. According to FIGS. 4 and 5, for instance, if the classifiers 152 suggest that there is a bucket implement 104 which extends through a linkage 106 from a body which includes an operator cab 110 supported by wheeled traction devices 112, the method 158 may classify the work machine 102 as a wheel loader type of work machine 102. Alternatively, if no implements 104 are identified in any of the views depicted within the captured images 150, the method 158 may classify the work machine 102 as an off-highway truck, or the like. The changes in the spatial relationships over successive captured images 150 can also be used to suggest whether the work machine 102 is an articulated vehicle or not.

Figure 4:
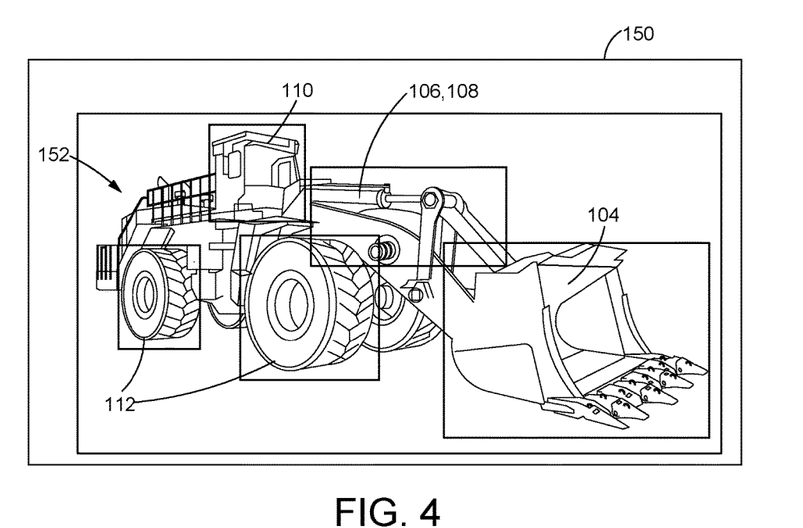
FIG. 4 is a pictorial illustration of one exemplary captured image with marked classifiers.
Figure 5:
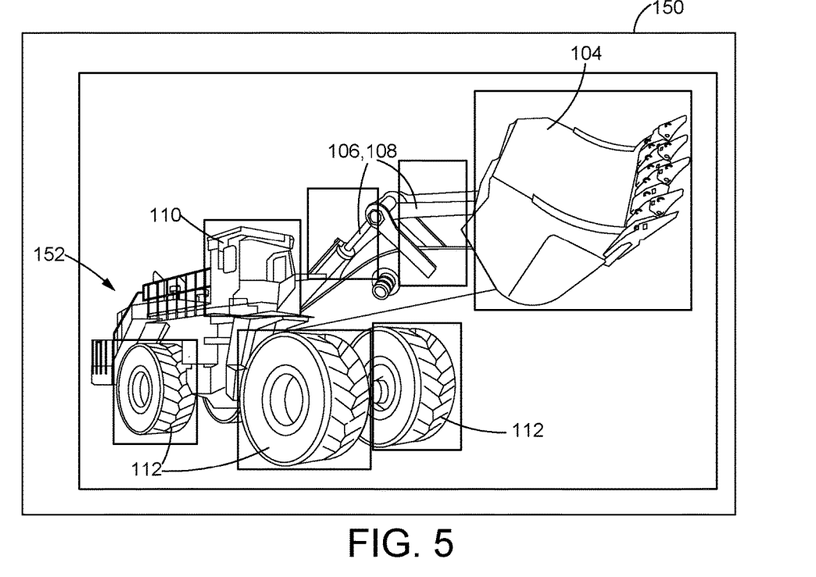
FIG. 5 is a pictorial illustration of another exemplary captured image with marked classifiers.

Furthermore, the method 158 in block 158-6 of FIG. 7 may determine or estimate a pose of the work machine 102 based on the classification, the spatial relationships and the classifiers 152. In FIGS. 4 and 5 for instance, the spatial relationship between the classifiers 152 may be used to determine whether the bucket implement 104 is raised, lowered, digging, carrying, dumping, and the like. The spatial relationships may also be used to determine whether the work machine 102 is articulated or not. For instance, method 158 may deem the work machine 102 as an articulated vehicle if successive captured images 150 suggest various poses that are not possible without articulation. In addition, the spatial relationships may also be used to help determine scale, such as how close the work machine 102 is relative to the image capture devices 120, and the like. If the relative locations of the image capture devices 120 are known, the scale may also be used to estimate the location of the work machine 102 relative to the worksite 100.

Once the work machine 102 has been classified and once the pose of the work machine 102 is determinable, the method 158 in FIG. 7 may proceed to an analytics stage and begin tracking the poses of the work machine 102 over time in block 158-7. For example, the method 158 may keep records in memory with respect to the pose or anticipated operation of the work machine 102 and at the time at which such pose or operation occurred. Based on such records, the method 158 in block 158-8 may be able to determine, measure, calculate or derive analytics related to the work machine 102 and/or the worksite 100. As indicated above, the analytics may relate to one or more of work productivity of the work machine 102, overall work progress, a state of operation of the work machine 102, a state of the terrain within the worksite 100, detected changes in the worksite 100, and the like. Furthermore, such analytics may be presented to one or more operators via a user interface 134 or an output device 138 thereof, as shown in FIGS. 2 and 6.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of classifying a work machine within a worksite, the method comprising:
   receiving one or more captured images of the work machine from one or more image capture devices positioned around the worksite and remote from the work machine;
   identifying at least two classifiers within the captured images of the work machine, wherein each classifier is indicative of a known component that is common to all work machines of the work machine type of the work machine;
   determining spatial relationships between the classifiers within the captured images based on the relative positions of the classifiers as measured within the captured images;

determining a classification and a pose of the work machine based on the spatial relationships;
tracking the determined poses of the work machine over time;
determining analytics related to the work machine and the worksite based on the tracked poses, the analytics including actual data derived from the poses of the work machine and representing a volume of work actually performed by the work machine within a given timeframe, and model data representing a predetermined volume of work performed by the work machine within the given timeframe; and
displaying the analytics based on the classifications and the poses of the work machine.

2. The method of claim 1, wherein the captured images include at least one video and the image capture devices includes at least one video camera installed in relation to one of the work machine and the worksite.

3. The method of claim 1, wherein each of the classifiers, the classification and the pose is visually recognized based on reference data retrieved from a database, the reference data visually associating each of the classifiers to one of a plurality of known machine components and visually associating different spatial relationships to known classifications and poses.

4. The method of claim 3, wherein the known machine components include two or more of wheels, tracks, linkages, machine implements, operator cabs, and work machines.

5. The method of claim 1, wherein the analytics include one or more of work productivity of the work machine, work progress, a state of the work machine, and a state of a terrain within the worksite.

6. A system for classifying a work machine within a worksite, the system comprising:
one or more image capture devices configured to generate one or more captured images of the work machine; and
a visual recognition device in communication with the one or more image capture devices positioned around the worksite and remote from the work machine, the visual recognition device configured to
receive the captured images from the image capture devices,
identify at least two classifiers within the captured images wherein each classifier is indicative of a known component that is common to all work machines of the work machine type of the work machine,
determine spatial relationships between the classifiers within the captured images based on the relative positions of the classifiers as measured within the captured images,
determine a classification and a pose of the work machine based on the spatial relationships,
track the determined poses of the work machine over time,
determine analytics related to the work machine and the worksite based on the tracked poses, the analytics including actual data derived from the poses of the work machine and representing a volume of work actually performed by the work machine within a given timeframe, and model data representing a predetermined volume of work performed by the work machine within the given timeframe, and
cause the display of the analytics based on the classifications and the poses of the work machine.

7. The system of claim 6, wherein the image capture devices include at least one video camera installed in relation to one of the work machine and the worksite, and the captured images include at least one video.

8. The system of claim 6, further comprising one or more databases in communication with the visual recognition device and configured to retrievably store reference data, the reference data visually associating each of the classifiers to one of a plurality of known machine components and visually associating different spatial relationships to known classifications and poses.

9. The system of claim 8, wherein the visual recognition device is configured to visually recognize each of the classifiers based on the reference data.

10. The system of claim 8, wherein the visual recognition device is configured to visually recognize the classification and the pose of the work machine based on the reference data.

11. The system of claim 8, wherein the database retrievably stores reference data visually associating the classifiers to known machine components including two or more of wheels, tracks, linkages, machine implements, operator cabs, and work machines.

12. The system of claim 6, further comprising one or more tracking devices configured to acquire terrain measurements from the worksite, the visual recognition device being configured to track the pose of the work machine and the terrain measurements over time, and determine the analytics related to the work machine and the worksite based on the tracked pose and terrain measurements, the analytics including one or more of work productivity of the work machine, work progress, a state of the work machine, and a state of a terrain within the worksite.

13. A device for classifying a work machine within a worksite, the device comprising:
a communication device in communication with one or more image capture devices positioned around the worksite and remote from the work machine;
an output device;
a memory configured to retrievably store one or more algorithms; and
a controller in communication with each of the communication device, the output device and the memory, the controller being configured to
receive one or more captured images of the work machine from the image capture devices,
identify at least two classifiers within the captured images, wherein each classifier is indicative of a known component that is common to all work machines of the work machine type of the work machine,
determine spatial relationships between the classifiers within the captured images based on the relative positions of the classifiers as measured within the captured images,
determine a classification and a pose of the work machine based on the spatial relationships,
track the determined poses of the work machine over time and store the poses in the memory,
determine analytics related to the work machine and the worksite based on the tracked poses, the analytics including actual data derived from the poses of the work machine and representing a volume of work actually performed by the work machine within a given timeframe, and model data representing a desired volume of work performed by the work machine within the given timeframe, and cause the output device to display the analytics based on the classifications and the poses of the work machine.

14. The device of claim 13, wherein the communication device is in communication with one or more databases configured to retrievably store reference data, the reference data visually associating each of the classifiers to one of a plurality of known machine components and visually associating different spatial relationships to known classifications and poses.

15. The device of claim 14, wherein the controller is configured to visually recognize each of the classifiers, the classification and the pose of the work machine based on the reference data.

16. The device of claim 14, wherein the database retrievably stores reference data visually associating the classifiers to known machine components including two or more of wheels, tracks, linkages, machine implements, operator cabs, and work machines.

17. The device of claim 13, wherein the communication device is in communication with one or more tracking devices configured to acquire terrain measurements from the worksite, the controller being configured to track the pose of the work machine and the terrain measurements over time, and determine the analytics related to the work machine and the worksite based on the tracked pose and terrain measurements, the analytics including one or more of work productivity of the work machine, work progress, a state of the work machine, and a state of a terrain within the worksite.

* * * * *